US012283265B1

(12) United States Patent
Sumberg

(10) Patent No.: US 12,283,265 B1
(45) Date of Patent: Apr. 22, 2025

(54) OWN VOICE REVERBERATION RECONSTRUCTION

(71) Applicant: Apple Inc., Cupertino, CA (US)

(72) Inventor: David A. Sumberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 17/709,339

(22) Filed: Mar. 30, 2022

Related U.S. Application Data

(60) Provisional application No. 63/173,304, filed on Apr. 9, 2021.

(51) Int. Cl.

| | |
|---|---|
| ***G10K 15/08*** | (2006.01) |
| ***G10K 15/02*** | (2006.01) |
| ***H04R 1/08*** | (2006.01) |
| ***H04R 1/10*** | (2006.01) |
| ***H04R 3/00*** | (2006.01) |

(52) U.S. Cl.
CPC ............. *G10K 15/08* (2013.01); *G10K 15/02* (2013.01); *H04R 1/08* (2013.01); *H04R 1/1041* (2013.01); *H04R 3/00* (2013.01); *H04R 2420/07* (2013.01)

(58) Field of Classification Search
CPC .... H04R 3/005; H04R 1/406; H04R 2420/07; H04R 3/04; H04R 5/027; H04R 5/033; H04R 5/04; H04R 1/028; H04S 2400/15; H04S 2420/01; H04S 7/304; H04S 2420/03; H04S 7/40; H04S 2400/01; H04S 2400/11; H04S 3/008; G10L 19/008; G10L 19/167; G10L 2021/02082; G10L 2021/02166; G10L 21/0216; G10L 25/84; G06F 3/011; G06F 3/012; G06F 3/013; G06F 3/14; G06F 3/165
USPC .......................................... 381/63, 1, 92, 74
See application file for complete search history.

(56) References Cited

U.S. PATENT DOCUMENTS

| | | | | |
|---|---|---|---|---|
| 10,038,967 | B2 * | 7/2018 | Jot | G10L 19/018 |
| 10,090,001 | B2 | 10/2018 | Theverapperuma et al. | |
| 10,291,975 | B2 * | 5/2019 | Howell | H04R 1/1041 |
| 2014/0016793 | A1 | 1/2014 | Gardner | |
| 2019/0019495 | A1 * | 1/2019 | Asada | H04R 1/1016 |
| 2019/0104424 | A1 | 4/2019 | Hariharan et al. | |
| 2019/0304477 | A1 | 10/2019 | Wojcieszak et al. | |
| 2019/0387352 | A1 * | 12/2019 | Jot | G10K 15/10 |
| 2020/0236487 | A1 * | 7/2020 | Kratz | H04S 3/008 |

(Continued)

FOREIGN PATENT DOCUMENTS

| | | | | |
|---|---|---|---|---|
| CA | 3148563 | * | 7/2015 | H04S 1/00 |

*Primary Examiner* — Lun-See Lao
(74) *Attorney, Agent, or Firm* — Aikin & Gallant, LLP

(57) ABSTRACT

A method that includes determining a set of one or more reverberation parameters of an extended reality (XR) environment in which a user is to participate, determining whether an audio source device is wirelessly communicatively coupled to send audio to an audio output device, in response to determining that the audio source device is not wirelessly communicatively coupled to the audio output device obtaining a microphone signal produced by a microphone of the audio source device, producing a reverberant audio signal from the microphone signal according to the set of one or more reverberation parameters, and sending the reverberant audio signal to drive a speaker driver of the audio source device.

26 Claims, 6 Drawing Sheets

(56) References Cited

U.S. PATENT DOCUMENTS

| | | | | |
|---|---|---|---|---|
| 2021/0329381 | A1* | 10/2021 | Holman | G10L 21/0216 |
| 2022/0101623 | A1* | 3/2022 | Walsh | G06V 20/64 |

* cited by examiner

OWN VOICE REVERBERATION RECONSTRUCTION

CROSS-REFERENCE TO RELATED APPLICATIONS

This application claims the benefit of and priority to U.S. Provisional Patent Application Ser. No. 63/173,304 filed Apr. 9, 2021, which is hereby incorporated by this reference in its entirety.

FIELD

An aspect of the disclosure relates to an audio system that performs own voice reverberation reconstruction. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is an audio system that reconstructs own voice reverberation of a user who is participating within an extended reality (XR) environment (e.g., a virtual reality (VR) environment, a mixed reality (MR) environment, etc.). The audio system determines a set of one or more reverberation parameters of the XR environment in which the user is participating. For example, when the user (e.g., avatar associated with the user) is within a virtual room, the system may determine the room acoustics, such as a sound reflection value of the virtual room. The system determines whether an audio source device (e.g., a tablet computer, a smartphone, etc.) is wirelessly communicatively coupled (e.g., via any wireless protocol, such as BLEUTOOTH protocol) to send audio (e.g., of the XR environment) to an audio output device, such as a wireless headset. In particular, the system determines whether the user is participating within the XR environment using the audio output device (e.g., to at least output audio of the XR environment). If not, the audio system uses a microphone signal to reconstruct the user's own voice. For instance, the system obtains a microphone signal produced by a microphone of the audio source device, and produces a reverberant audio signal from the microphone signal according to the set of reverberation parameters. The system sends the reverberant audio signal to drive a speaker driver of the audio source device.

In another aspect, the system determines whether the audio source device is wirelessly communicatively coupled with the audio output device via a first (or "low-latency") wireless audio connection or a second (or "normal") wireless audio connection. For instance, the first connection and the second connection may both be BLUETOOTH connections, where the first connection has an end-to-end latency that is less than an end-to-end latency of the second connection. An example of the first connection may be an Ultra-Low Latency Audio (ULLA) connection, while an example of the second connection may be an Audio Distribution Profile (A2DP) connection over BLUETOOTH. In response to determining that the devices are coupled via the first connection, the system obtains the microphone signal, produces a (e.g., second) reverberant audio signal from the microphone signal according to the set of reverberation parameters. In another aspect, in response to determining that the devices are coupled via the second connection, the system transmits, over the second connection, the set of reverberation parameters to the audio output device, which becomes configured to produce a reverberant audio signal according to the set of one or more reverberation parameters. To produce the reverberant audio signal, the audio output device obtains an accelerometer signal from an accelerometer of the audio output device and generates a synthesized audio signal based on the accelerometer signal. In this case, the audio output device produces the reverberant audio signal from the synthesized audio signal according to the reverberation parameters. In some aspects, the reverberant audio signal produced by the audio output device includes a combination of the synthesized audio signal and the accelerometer signal. For instance, the reverberant audio signal may include spectral content from the synthesized audio signal above a frequency threshold (e.g., 2 kHz) and spectral content from the accelerometer signal below the threshold.

In some aspects, the audio source device may produce different reverberant audio signals by performing different noise suppression operations based on whether the audio source device is wirelessly coupled to the audio output device. For example, in response to determining that the audio source device is not wirelessly communicatively coupled to the audio output device, the source device may reduce (or suppress) noise in the microphone signal that is used to produce the (first) reverberant audio signal by performing a first noise suppression algorithm. If, however, the audio source device is wirelessly coupled (e.g., via the first wireless audio connection), the source device may reduce noise in the microphone signal by performing a second noise suppression algorithm that is different than the first noise reduction algorithm. For example, the first noise reduction algorithm may include adaptive beamformer operations, while the second algorithm includes non-adaptive beamformer operations.

According to another aspect of the disclosure, a method may be performed by an audio output device having wireless capabilities of receiving audio from an audio source device. In response to being wirelessly communicatively coupled with the audio source device via a first wireless audio connection, receiving, over the first wireless audio connection, an audio signal that includes audio of an extended reality (XR) environment for output through a speaker driver of the audio output device. In response to being wirelessly communicatively coupled with the audio source device via a second wireless audio connection: obtaining, over the second wireless audio connection, a set of one or more reverberation parameters of the XR environment, and producing a reverberant audio signal according to the set of one or more reverberation parameters.

In one aspect, the audio output device may obtain an accelerometer signal from an accelerometer and generate a synthesized audio signal based on the accelerometer signal, where the reverberant audio signal is produced from the synthesized audio signal. In some aspects, the reverberant audio signal includes a combination of the synthesized audio signal and the accelerometer signal.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
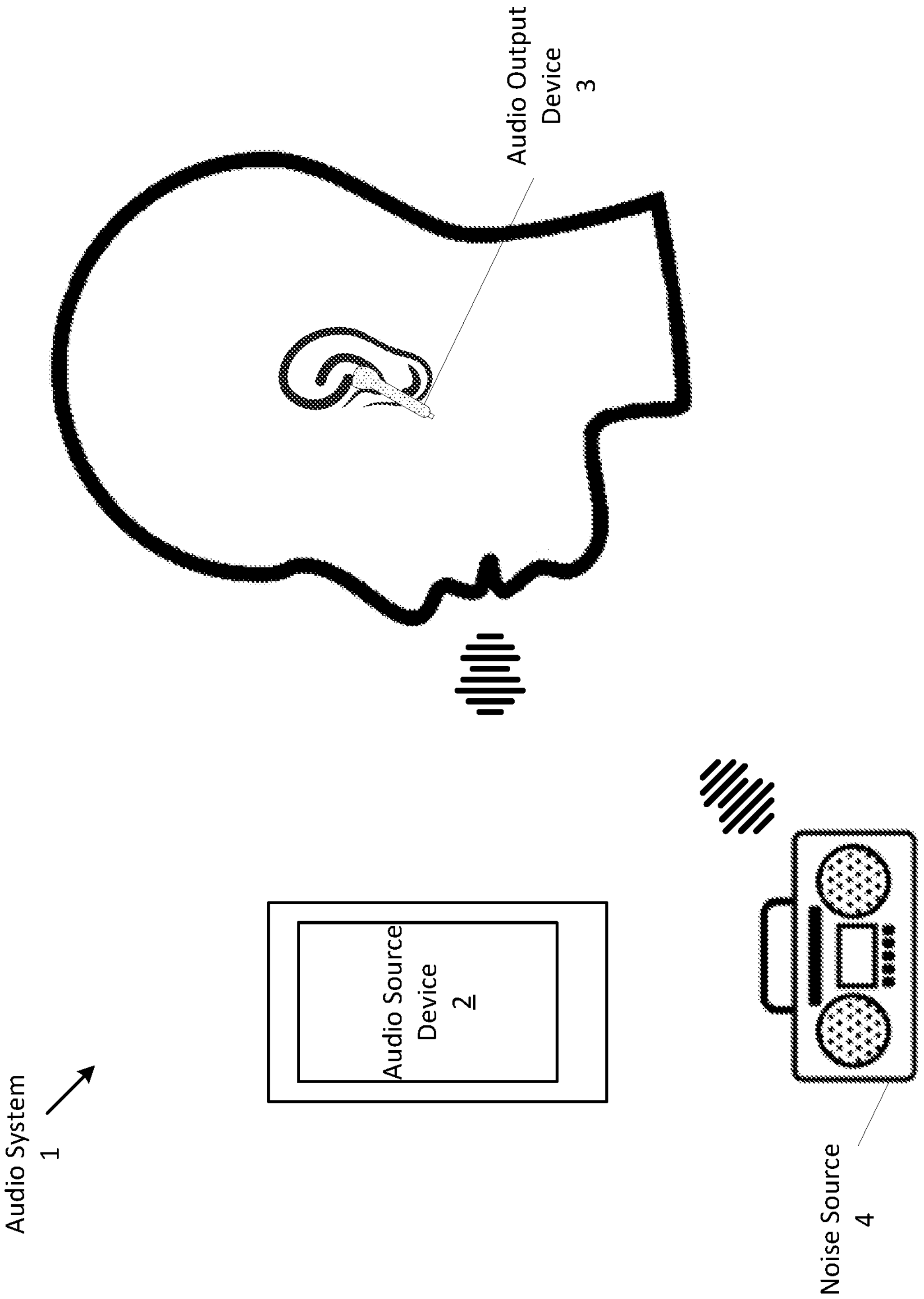
FIG. 1 shows an audio system that includes an audio source device and an audio output device for own-voice reverberation reconstruction.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 shows an audio system 1 that includes an audio source device 2 and an audio output device 3 for own-voice reverberation reconstruction (e.g., of a user). As illustrated, the audio source device is a multimedia device, more specifically a smart phone. In one aspect, the source device may be any electronic device (e.g., that includes one or more processors, memory, etc.) that can perform audio signal processing operations and/or networking operations. Other examples of source devices may include a desktop computer, a smart speaker, etc. In some aspects, the source device may be any wireless electronic device, such as a tablet computer, a smart phone, etc. In another aspect, the source device may be a wearable device (e.g., a smart watch, etc.) and/or a HMD, such as smart glasses, headphones, etc.

The audio output device 3 is illustrated as being wireless headphones positioned next to (or against) the user's ear. In particular, the device is illustrated as being a left wireless headphone (earphone or earbud) that is against the user's left ear. Once placed against the user's ear, the output device (e.g., a housing of the output device) may acoustically seal off the user's ear from the ambient environment, thereby preventing (or reducing) sound leakage into (and out of) the user's ear (and/or ear canal). For instance, the housing may include a portion (e.g., an ear tip) that is inserted into the user's ear canal, sealing off the user's ear canal. In one aspect, the headphones may include another right wireless headphone that is positioned against the user's right ear. In some aspects, the output device may be any type of headphones, such as on-ear or over-the-ear headphones. In the case of over-the-ear headphones, the output device may be a part of a headphone housing that is arranged to cover at least a portion of the user's ears to (at least partially) seal off the ear (and ear canal) from the ambient environment. In some aspects, the output device may be any (or a part of any) HMD, such as smart glasses. For instance, the audio output device may be a part of a component (e.g., a frame) of the smart glasses that may be placed into or on the user's ears. In another aspect, the output device may be a HMD that (at least partially) does not cover the user's ears (or ear canals), thereby leaving the user's ears exposed to the ambient environment.

In some aspects, the audio output device 3 may be any electronic device that is configured to output sound, performing networking operations, and/or perform audio signal processing operations, as described herein. For example, the audio output device may be configured to receive one or more audio signals (e.g., from the audio source device), and may be configured to use the one or more audio signals to drive one or more speakers to output sound directed towards the user's ears and/or ear canals. More about receiving audio signals for output is described herein. In one aspect, the audio output device may be a device that is not designed to be positioned next to (or against) the user's ears. For example, the output device may be a (e.g., stand-alone) loudspeaker, a smart speaker, a part of a home entertainment system, a part of a vehicle audio system, etc. In some aspects, the output device may be a part of another electronic device, such as a laptop, a desktop, or a multimedia device, such as the source device 2.

In one aspect, the audio output device may be configured to be wirelessly communicatively coupled to (with) the audio source device, such that both devices are configured to communicate with one another. For example, the wireless audio output device, such as a wireless headset or a pair of wireless earphones, can connect via a Wireless Personal Area Network (WPAN) connection to the audio source device, in order to receive an audio stream from the audio source device. In one aspect, the WPAN connection may be via an Advanced Audio Distribution Profile (A2DP) connection or another audio profile connection of a BLUETOOTH communication protocol. To stream high-quality audio data, the audio source device packetizes the audio data (e.g., partitions the audio data into units for transmission) according to the audio profile and stores the packets of audio data in transmit buffers. Packets are then transmitted over BLUETOOTH (e.g., using an over-the-air (or wireless) radio frequency (RF) signal) to the wireless audio output device. The received packets are stored in long buffers in the output device in order to provide continuous audio playback in situations when future packets are dropped (e.g., during transmission interference). Audio data in the buffers are de-packetized and processed for audio output through at least one speaker. This process is repeated while audio output is desired at the audio output device.

In one aspect, the audio system 1 may be used by a user for participating in an XR environment. Specifically, both the source device 2 and the output device 3 may be configured to present content of the XR environment (e.g., a VR environment) to a user. While presenting the XR environment, the source device may be configured to obtain an input audio signal containing audio content of the XR environment for output (e.g., by transmitting the audio signal to the audio output device for driving one or more speakers of the output device and/or by driving one or more speakers of the audio source device). In one aspect, the source device may also be configured to obtain image data (e.g., one or more still images, video data, etc.,) of the environment for display on one or more display screens. For instance, when the user is participating within a virtual conference, the image data may include a virtual representation (e.g., from a first-perspective view) of a virtual conference room, and the input audio signal may include audio (e.g., virtual sounds) emanating from within the virtual conference room (e.g., a door opening, people talking, etc.).

In one aspect, the audio system may be configured to allow the user to communicate with other participants within the XR environment. For example, the audio system may include at least one microphone (e.g., microphone 20 of audio source device illustrated in FIG. 2), that is arranged to capture sound of the ambient environment. In this case, while the user speaks, the microphone may capture the user's speech as a microphone signal, which may be transmitted to one or more other electronic devices of user's who are participating within the XR environment for output. Communicating with others within an XR environment as opposed to communicating within a physical environment may sound less natural to other participants within the XR environment, as well to the user. For instance, the microphone may capture ambient noises from a noise source 4 (e.g., music playing on a stereo) within the physical environment, which may distort and/or mask the user's voice. In addition, when talking within a physical environment (e.g., a room), the user's own voice is perceived by the user through one or more conduction paths. For instance, when the user speaks, sound of the user's speech travels along a direct conduction path from the user's mouth to the user's ears. In addition, sound travels along an indirect reverberation path in which the user's speech reverberates within the room (e.g., by reflecting off one or more objects, such as a wall, a ceiling, etc.) and returns to the user's ears. To speak naturally in an environment, a person uses a combination of these paths to self-monitor vocal output. When speaking within an XR environment, however, the user's own voice perception (e.g., how the user hears the user's own voice as the user is speaking) may be less natural since the indirect reverberation path accounts for reflections in the user's physical environment rather than reflections within the XR environment and/or the paths may be blocked due to having an audio output device against the user's ear.

To solve this problem, the present disclosure describes an audio system (e.g., system 1) that performs own voice reverberation reconstruction operations. Specifically, the audio system determines a set of one or more reverberation parameters of the XR environment in which a user is to participate. For instance, the parameters may define acoustics within the XR environment, such as a reverberation decay rate or time, a direct-to-reverberation ratio, a reverberation measurement, or other equivalent or similar measurement. The system obtains a microphone signal produced by a microphone, which may include the user's speech, and produces a reverberant audio signal from the microphone signal according to the reverberation parameters. In one aspect, the reverberant audio signal may account for a virtual indirect reverberation path within the XR environment. The system sends the reverberant audio signal to drive a speaker, such that the user may hear the user's own voice that accounts for reflections within the XR environment. In one aspect, the audio system may perform a "clean-voice" (or noise suppression) algorithm that reduces ambient noise in the microphone signal by separating the user's own voice from ambient noises (e.g., from source 4) that are picked up by the microphones into a clean voice signal. The benefit being that the noise source 4 contained within the physical environment is removed to provide the user with a more realistic experience (e.g., the user perceiving the user's own voice as if speaking within the XR environment that does not contain the noise source within the physical environment). Thus, this clean voice signal provides a more natural experience to the user when used for own voice reinforcement.

In one aspect, a drawback of the own voice reverberation operations described herein is that at least some of the operations (e.g., the clean-voice algorithm) require a significant amount of processing and introduces lag into a signal processing chain of the audio system. This lag may result in the user's own voice being perceived by the user as an undesirable echo. These drawbacks, however, may be mitigated when the operations are performed by an electronic device that has enough processing resources. For example, the processing requirement and lag may be within a tolerable limit (e.g., within a threshold) when performed by the audio source device, and when the reverberant audio signal is outputted by speakers that are coupled (e.g., via a wired connection) to (e.g., integrated within) the audio source device.

If, however, the audio source device is wirelessly communicatively coupled with a wireless audio output device, such as device 3, to send audio to the output device, the lag or end-to-end latency may reduce the user experience. For instance, streaming audio data through a WPAN connection, or more specifically a BLUETOOTH connection (e.g., using A2DP profile), may require tens of milliseconds of audio processing to generate an encoded audio packet and up to a few hundred milliseconds of buffering, resulting in over 250 milliseconds of end-to-end latency. In addition, any error-correction schemes (e.g., forward error correction (FEC) code) that are used to detect errors in packets may add additional latency. In addition, the total latency, which may include the BLUETOOTH end-to-end latency and the processing time required for performing the own voice reverberation operations (e.g., clean-voice algorithm, etc.) may result in an undesirable delay that is noticeable by the user, as described herein.

To solve this problem, the present disclosure describes an audio system that operates in different operational modes based a connection state (e.g., a type of wireless connection) between the audio source device and the audio output device. For instance, the audio system may determine whether the audio source device and the audio output device are coupled via a first (or "low-latency") wireless audio connection or a second (or "normal") wireless audio connection. In some aspects, the normal wireless audio connection may be any wireless connection that is configured to stream high-quality audio data, such as an A2DP connection. While, in another aspect, the low-latency connection may be any wireless audio connection that has a lower end-to-end latency than an end-to-end latency of the normal wireless audio connection, such as an Ultra-Low Latency Audio (ULLA) connection. More about the connections is described herein.

If the source and audio devices are connected via a low-latency wireless audio connection, the audio system 1 may operate in a first operational mode in which the audio source device may perform at least some of the own voice reverberation operations described herein. For instance, the source device may produce a (e.g., second) reverberant audio signal from the microphone signal according to reverberation parameters of the XR environment, and transmit the reverberant audio signal, via the low-latency wireless audio connection to the audio output device for output through a speaker of the output device. Although this connection has less latency than the normal connection, the source device adjusts the audio signal processing operations to compensate for the end-to-end latency of the low-latency connection. For example, the audio source device may perform a different noise reduction algorithm than the algorithm previous described. Specifically, the different algorithm may be a low-power version of the original noise reduction algorithm. More about the differences between the two algorithms is described herein.

Otherwise, if the source and audio devices are connected via the normal wireless audio connection, which is a higher latency state than the low-latency connection, the audio system may operate in a second operational mode in which the output device may perform one or more own voice reverberation reconstruction operations. In particular, the source device may be configured to transmit the reverberation parameters to the audio output device (e.g., without performing the clean-voice algorithm upon a microphone signal, etc.). The audio output device may be configured to synthetically reconstruct the user's own voice using an accelerometer signal. Specifically, the output device may be configured to obtain an accelerometer signal from an accelerometer of the output device, generate a synthesized audio signal based on the accelerometer signal, and produce a reverberant synthesized audio signal from the synthesized audio signal according to the reverberation parameters. Thus, the audio system may adjust what own-voice reverberation operations and/or which devices perform the operations based on the type of connection state between the devices.

Figure 2:
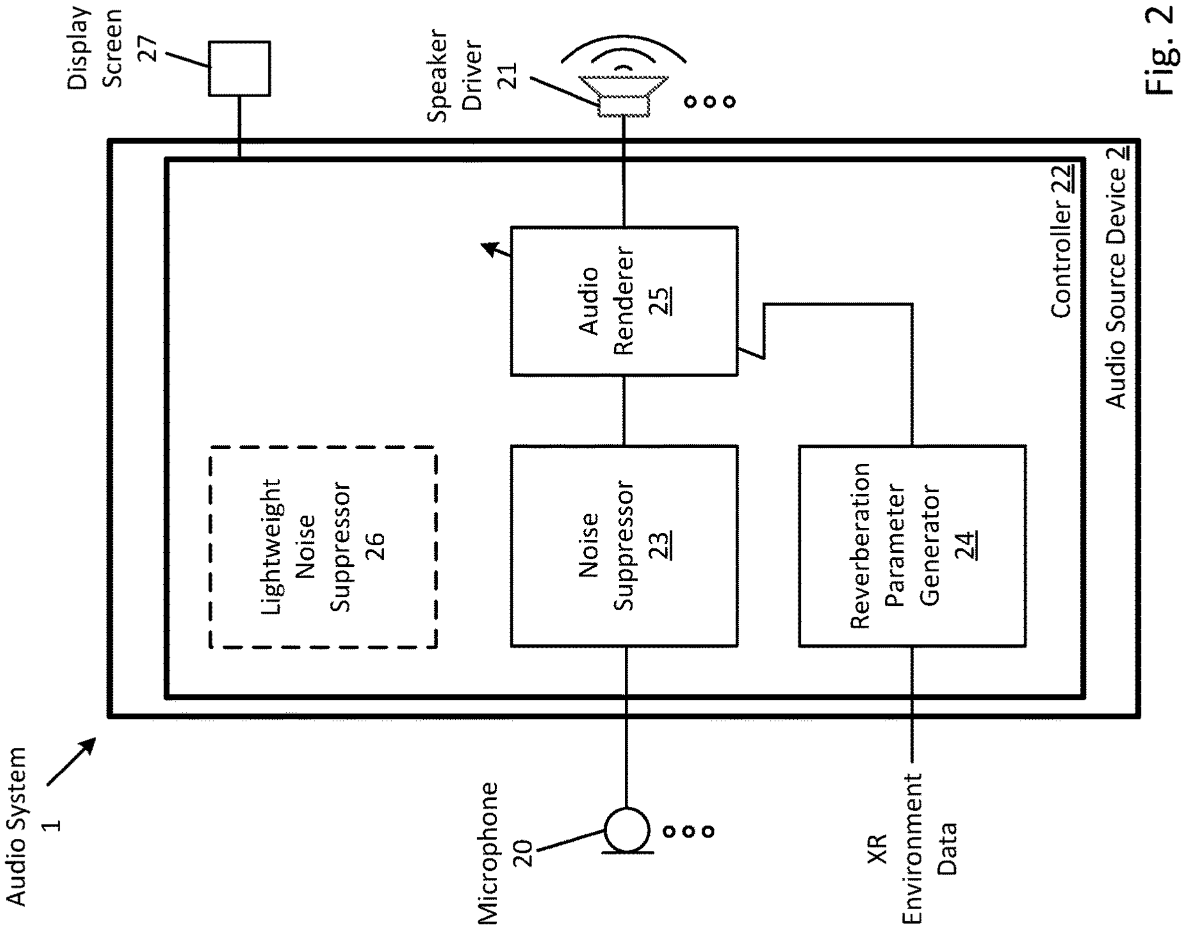
FIG. 2 shows a block diagram of the audio system in which the audio source device performs own-voice reverberation reconstruction operations according to one aspect.

FIG. 2 shows a block diagram of the audio system 1 in which the audio source device performs own-voice reverberation reconstruction operations to produce a reverberant audio signal for output by a speaker of the audio source device, according to one aspect. In one aspect, at least some of the own-voice reverberation reconstruction operations described with respect to this figure may be performed while the source device is not wirelessly communicatively coupled to an audio output device (e.g., device 3 in FIG. 1). As shown, the audio system 1 includes the audio source device 2, a microphone 20, a speaker driver 21, and a display screen 27. In one aspect, each of these components may be a part of (or integrated within) the audio source device. In another aspect, at least some of the components may be a part of separate electronic devices. In which case, the components may be communicatively coupled (e.g., via wire or wireless connection). In another aspect, the audio source device may include less or more components. For instance, the audio source device may include one or more microphones, one or more speaker drivers, and/or one or more display screens. While as another example, the audio source device may not include a display screen at all.

In one aspect, the microphone 20 may be any type of microphone (e.g., a differential pressure gradient micro-electromechanical system (MEMS) microphone) that is configured to convert acoustic energy caused by sound waves propagating in an acoustic (e.g., physical) environment into an audio (e.g., microphone) signal. The speaker driver 21 may be an electrodynamic driver that may be specifically designed for sound output at certain frequency bands, such as a woofer, tweeter, or midrange driver, for example. In one aspect, the speaker driver may be a "full-range" (or "full-band") electrodynamic driver that reproduces as much of an audible frequency range as possible. The speaker driver "outputs" or "plays back" audio by converting an analog or digital speaker driver signal into sound. In one aspect, the speaker driver may be an "internal" speaker that may be positioned in a housing of the audio source device and arranged to direct (project or output) sound towards (or into) a user's ear (or ear canal). For instance, the speaker driver may be a part of headphones that are designed to be worn on the user's head. In one aspect, the speaker driver 21 may be a part of an electronic device that is coupled to the audio source device via a wired connection. For example, the speaker driver may be a part of wired headphones. In another aspect, the speaker driver may be an "extra-aural" speaker driver that is positioned on (or integrated into) the audio source device (or another electronic device that is communicatively coupled with the audio source device), and arranged to direct sound into the physical environment in which the audio source device is located.

In one aspect, the (e.g., audio source device 2 of the) audio system 1 may include two or more extra-aural speaker drivers that form a speaker array that is configured to produce spatially selective sound output. For example, the array may produce directional beam patterns of sound that are directed towards locations within the physical environment, such as the ears of the user. In another aspect, the audio source device may include two or more microphones that form a microphone array that is configured to direct a sound pickup beam pattern towards a particular location, such as the user's mouth. More about producing directional beam patterns is described herein.

The display screen 27 may be configured to display image data and/or video data (or signals) to the user of the source device 2. In one aspect, the display screen may be a miniature version of known displays, such as liquid crystal displays (LCDs), organic light-emitting diodes (OLEDs), etc. In another aspect, the display may be an optical display that is configured to project digital images upon a transparent (or semi-transparent) overlay, through which a user can see. The display screen may be positioned in front of one or both of the user's eyes. In another aspect, the audio system may include several display screens, such as a screen for each of (e.g., positioned in front of) the user's eyes.

The controller 22 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations, such as own voice reverberation reconstruction operations, as described herein. In one aspect, the controller is configured to present an XR environment to a user of the audio source device. Specifically, the controller is configured to receive image data that includes a visual representation of the XR environment and display the data on the display screen 27. In addition, the controller may be configured to receive audio data that includes sounds within the XR environment and output the audio data via one or more speaker drivers 21. More about the operations performed by the controller is described herein. In one aspect, operations performed by the controller may be implemented in software (e.g., as instructions stored in memory of the audio source device (and/or memory of the controller) and executed by the controller and/or may be implemented by hardware logic structures.

As illustrated, the controller 22 may have one or more operational blocks, which may include a noise suppressor 23, a reverberation parameter generator 24, an audio renderer 25, and a lightweight noise suppressor 26.

The noise suppressor 23 is configured to obtain (or receive) one or more microphone signals produced by one or more microphones 20, and is configured to perform a (first) noise suppression (or clean-voice) algorithm to suppress (or reduce) noise within the microphone signal. Specifically, the noise suppressor processes the signal by reducing or eliminating the ambient noise from the signal to produce a speech signal (or noise suppressed audio signal) that contains mostly speech (e.g., of the user of the audio source device). For instance, the suppressor may process the microphone signal to improve its signal-to-noise ratio (SNR). To do this, the suppressor may spectrally shape the received signal by applying one or more filters (e.g., a low-pass filter, a band-pass filter, etc.) upon the signal to reduce the noise. As another example, the suppressor may apply at least one gain value to the received signal. In some aspects, the noise suppressor 23 may perform any noise suppression algorithm to reduce the noise, and improve the SNR of the microphone signal.

In another aspect, the noise suppressor 23 may perform beamformer operations to process received (two or more) microphone signals produced by a microphone array of the audio system 1. To do this, the suppressor may process the microphone signals by applying beamforming weights (or weight vectors). Once applied, the suppressor produces at least one sound pickup output beamformer signal that includes a directional beam pattern. In one aspect, the noise suppressor may perform adaptive beamformer operations in which the beamforming weights may be adjusted in order to adjust one or more parameters of the directional beam pattern (e.g., a direction along which the pattern is directed, a directivity, etc.). In one aspect, the noise suppressor may adapt a directional beam pattern towards a sound source at which speech is originating within the acoustic environment (e.g., at the user's mouth) in order to maximize the SNR of the captured speech. To do this, the noise suppressor may process at least a portion of one or more microphone signals for a given period of time (e.g., ten seconds) to identify one or more speech sound sources. Once identified, the suppressor may adjust the beamforming weights to be directed towards the identified sources. In one aspect, the noise suppressor may perform any audio signal processing method (e.g., sound source separation, etc.) to identify a speech sound source.

The controller 22 also includes a lightweight noise suppressor 26, which may be a "low-power" version of the noise suppressor 23. Specifically, the noise suppressor 23 may perform a first noise suppression algorithm, while the lightweight noise suppressor may perform a second, different, noise suppression algorithm that includes less, different, and/or similar noise suppressing operations as the first algorithm. The lightweight suppressor, however, may be configured such that noise suppressing operations require less processing power and/or processing time than the noise suppressor 23. For example, in contrast to the noise suppressor 23, the lightweight suppressor may perform non-adaptive beamformer operations in which beamformer weights are not adapted but instead are assigned default (or predefined) values. The noise suppressor 26 may apply beamformer operations upon one or more microphone signals captured by one or more microphones 20 to produce at least one sound pickup beam pattern (e.g., as one or more audio signals) that is directed towards a predefined location (e.g., in a direction of a user's mouth). As a result, the lightweight suppressor would require less processing time and power to produce a speech signal. In some aspects, the speech signal produced by the lightweight suppressor, however, may have a lower SNR than a SNR of a speech signal produced by the noise suppressor 23. More about the lightweight noise suppressor is described in FIG. 3.

The reverberation parameter generator 24 is configured to receive XR environment data, and is configured to generate a set of one or more reverberation parameters from the environment data. Specifically, the generator determines an amount of virtual reverberation caused by the XR environment based on virtual room acoustics of the environment in order to simulate a virtual indirect reverberation path. For instance, the XR environment data may include dimensions of the XR environment (e.g., virtual room dimensions in which an avatar of the user is located within) and/or dimensions and characteristics of virtual objects contained within the XR environment. The generator may be configured to use this data (e.g., by applying the data to a reverberation model, etc.) to determine reverberation parameters that define room acoustics of the environment, such as a sound reflection value, a sound absorption value, an impulse response for the XR environment, a reverberation decay rate or time, a direct-to-reverberation ratio, a reverberation measurement, or other equivalent or similar measurement. In another aspect, at least some of the reverberation parameters may be included within the XR environment data.

The audio renderer 25 is configured to obtain the (e.g., speech) audio signal produced by the noise suppressor 23 and obtain the set of one or more reverberation parameters generated by the generator 24, and is configured to render (or produce) a reverberant audio signal from the audio signal according to the set of one or more reverberation parameters. In particular, the renderer may use the reverberation parameters to determine an amount of virtual reverberation that would be caused when the audio signal is outputted into the XR environment. Once determined, the renderer may apply (or add) the amount of reverberation to the audio signal to produce the reverberant audio signal. In one aspect, the renderer may apply equalization operations to spectrally shape the audio signal (e.g., by applying one or more linear filters, such as a low-pass filter, etc.) according to the reverberation parameters. In some aspects, the audio renderer may perform spatial audio rendering operations in order to spatially render the audio signal. For example, the renderer may apply spatial filters (e.g., head-related transfer functions (HRTFs)) that are personalized for the user of the audio system in order to account for the user's anthropometrics. In another aspect, the spatial filters may be default filters. As a result, the renderer is configured to produce spatial audio signals (e.g., binaural audio signals), which when outputted through speakers 21 produces a 3D sound (e.g., giving the user the perception that sounds are being emitted from a particular location within an acoustic space).

In one aspect, the (e.g., controller 22 of the) audio source device uses the reverberant audio signal produced by the renderer to drive the speaker 21 in order to output the user's reverberated own-voice into the ambient environment. As described herein, the audio system may be configured to receive audio data of the XR environment for output. In this case, the audio renderer 25 may be configured to mix the XR environment audio data (e.g., one or more audio signals) with the reverberant audio signal to produce a combined audio signal for output to provide the user with a more immersive experience. As described herein, the audio system may include an array of extra-aural speakers. In this case, the audio renderer may include a beamformer that is configured to produce one or more directional beam patterns that includes the reverberant audio signal (and/or the audio data of the XR environment) to direct sound towards at least one location in the physical environment, as described herein.

Figure 3:
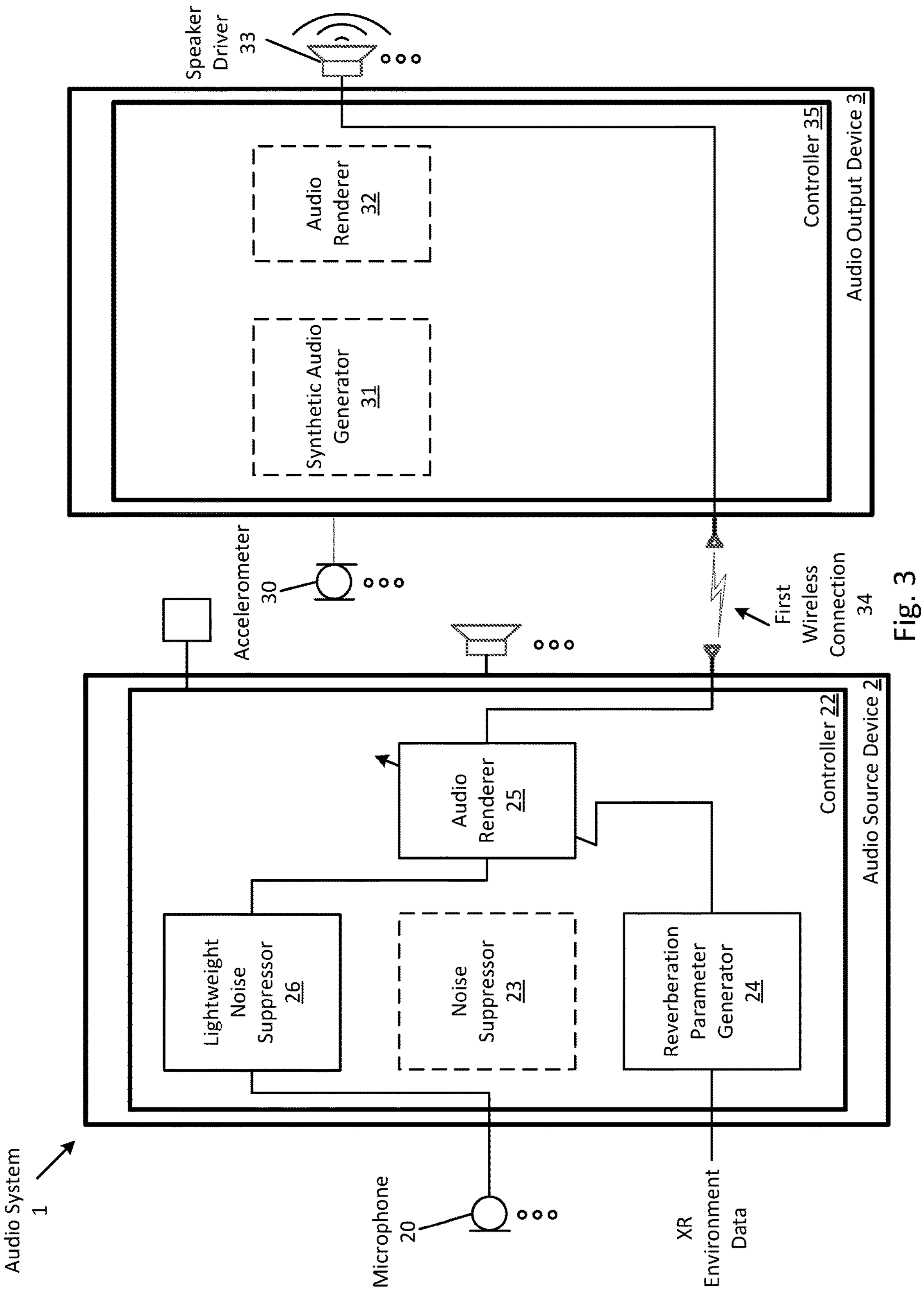
FIG. 3 shows a block diagram of the audio system that is operating in a first operational mode for performing own-voice reverberation reconstruction according to one aspect.
Figure 4:
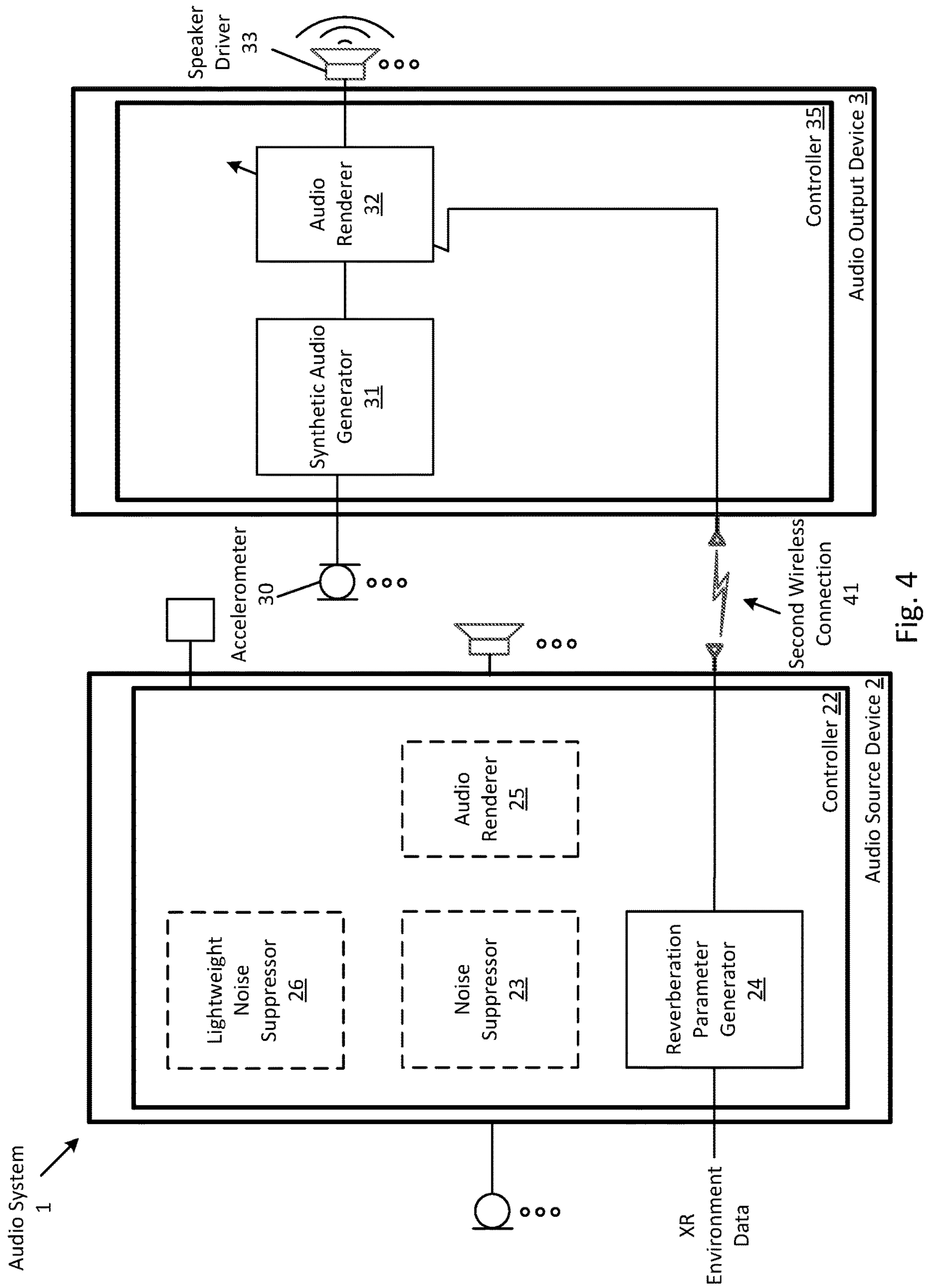
FIG. 4 shows a block diagram of the audio system that is operating in a second operational mode for performing own-voice reverberation reconstruction according to one aspect.

FIGS. 3 and 4 show block diagrams of the audio system operating in the first operational mode and the second operational mode, respectively, in which a user of the audio system is using the audio output device 3 to output audio content. Specifically, FIG. 3 shows a block diagram of the audio system operating in the first operational mode in which the audio source device 2 and the audio output device 3 are wirelessly coupled via a first (or "low-latency") wireless connection 34, and FIG. 4 shows a block diagram of the audio system operating in the second operational mode in which both devices are wirelessly coupled via a second (or "normal") wireless connection 41.

In one aspect, both types of connections differ based on each connection's end-to-end wireless (e.g., BLUETOOTH) latency. For instance, the low-latency connection may introduce an end-to-end latency within the processing chain that is less than an end-to-end latency of the normal connection (e.g., by a predefined threshold period of time). In one aspect, both connections may be established according to different wireless communication protocols (or profiles) over BLUETOOTH. For instance, the normal connection may be an A2DP high-quality audio connection. In contrast, the low-latency connection may be an ULLA connection in which latency is significantly reduced or minimized by implementing different wireless communication operations than A2DP, such as using time-efficient audio coding and decoding, limiting retransmissions, reducing time and frequency of acknowledgements, and by combining BLUETOOTH Classic (BTC) packets for downlink audio and downlink control with BLUETOOTH Low Energy (BTLE) packets for uplink control, uplink acknowledgments, and inter-device wireless communication. In another aspect, both types of connections may differ based on the type of codec used to encode/decode audio data. For example, the normal connection may use a codec with a latency that is above a threshold (e.g., an audio subband codec (SBC)), while the low-latency connection may use a low-latency codec that has a latency that is below the threshold (e.g., Audio Processing Technology (aptX), aptX HD, aptX Adaptive, etc.). Thus, in this example both connections may be A2DP connections, but each using different codecs.

Returning to FIG. 3, this figure shows a block diagram of the audio system 1 that includes the same (or similar) components of FIG. 2, as well as the audio output device 3

(which includes a controller 35), at least one accelerometer 30, and at least one speaker 33. In one aspect, the accelerometer 30 is arranged and configured to receive (detect or sense) speech vibrations that are produced while the user of the audio system is speaking, and produce an accelerometer signal that represents (or contains) the speech vibrations. Specifically, the accelerometer 30 is configured to sense bone conduction vibrations that are transmitted from the vocal cords of the user to the user's ear (ear canal), while speaking and/or humming. In one aspect, the accelerometer 30 may be a part of (or integrated with) the audio output device, such that when the output device is worn (e.g., against the user's ear), the accelerometer 30 is positioned to detect the speech vibrations. In another aspect, the speaker driver 33 may be coupled (e.g., a part of or integrated with) the audio output device 3. In another aspect, at least some of the components (e.g., the speaker driver 33) may be separate electronic devices that are communicatively coupled to the audio output device 3. As described herein, this figure illustrates the audio system 1 while in the first operational mode. Specifically, while in this mode the lightweight noise suppressor 26 of controller 22 performs noise suppression as opposed to the noise suppressor 23. For instance, the suppressor 26 obtains the (e.g., one or more) microphone signal from microphone 20, and is configured to perform the second noise suppression algorithm to produce a speech signal. In another aspect, in lieu of (or in addition to) using the lightweight noise suppressor 26, the noise suppressor 23 may be used to perform at least some noise suppression operations. The audio renderer 25 obtains the speech signal and the reverberation parameters from the generator 24 and produces a (second) reverberant audio signal.

The controller 22 is configured to transmit the reverberant audio signal, over the low-latency wireless audio connection 34, to the audio output device 3 for output through speaker driver 33. In particular, the controller 35 obtains the reverberant audio signal and uses the audio signal to drive the speaker driver 33. In one aspect, the controller 35 may perform one or more audio signal processing operations, such applying one or more linear filters to spectrally shape (e.g., equalize) the signal. In another aspect, the controller 35 may be configured to activate an active noise cancellation (ANC) function to produce an anti-noise signal for output through the speaker driver 33. In some aspects, the ANC may be implemented as one of a feedforward ANC, feedback ANC, or a combination thereof. To perform the ANC function, the controller 35 may receive a reference microphone audio signal from a microphone that captures external ambient sound. In one aspect, the microphone signal may be captured by microphone 20. In another aspect, the microphone signal may be captured by a microphone (not shown) that is a part of the audio output device 3. In another aspect, the controller may receive an error audio signal from another microphone (not shown) that captures sound from inside the user's ear. Using the microphone signal(s) the controller produces one or more anti-noise signals. In one aspect, the controller 35 may be configured to mix the anti-noise signal with the reverberant audio signal to produce a mix for driving the speaker driver 33.

Also shown in this figure, the controller 35 includes several operational blocks, including a synthetic audio generator 31 that is configured to generate a synthesized audio signal based on an accelerometer signal produced by accelerometer 30 and an audio renderer 32 that is configured to produce a reverberant synthesized audio signal. In one aspect, these operational blocks are not in the signal path illustrated herein, since the audio output device is receiving a reverberant audio signal from the audio source device and therefore does not need to produce a synthesized version of that signal. More about these operational blocks is described in FIG. 4.

FIG. 4 shows a block diagram of the audio system is operating in the second operational mode in which the audio output device 3 produces and outputs a reverberant synthesized audio signal according to one aspect. Since the audio source device 2 and the audio output device 3 are wirelessly coupled via the normal wireless connection 41 that has a higher end-to-end latency than the low-latency connection, the (controller 22 of the) audio source device may be perform less (or different) operations than if the system were operating in the first operational mode, as described herein. For instance, as shown, the noise suppressors 23 and 26, and the audio renderer 25 are no longer within the signal path, indicating that the controller 22 may not be performing these operations. Instead, the reverberation parameter generator 24 is generating the one or more reverberation parameters, and the audio source device 2 is transmitting the parameters, via the normal wireless connection 41, to the audio output device 3.

As shown, the synthetic audio generator 31 and the audio renderer 32 are in the signal path. In one aspect, the synthetic audio generator 31 is configured to obtain an accelerometer signal produced by the accelerometer 30, which is positioned and configured to detect speech vibrations of the user who is wearing the audio output device. As described herein, the accelerometer produces a signal that represents bone conduction vibrations caused while the user speaks. In one aspect, the accelerometer may be less sensitive to acoustic air vibrations (e.g., sounds) within the ambient environment. In other words, the accelerometer may be less sensitive to ambient noise, as opposed to when the user speaks. As a result, the accelerometer may be immune to capturing ambient noise sources, such as source 4 in FIG. 1. This immunity, however, does limit the range of frequencies in which the accelerometer is sensitive. Thus, the accelerometer may be configured to be sensitive to capture sounds ranging within a particular range of frequencies, such as low frequencies (e.g., frequencies less than and equaling a frequency threshold, such as 2 kHz).

The synthetic audio generator 31 is configured to generate a synthesized speech audio signal. This generated synthesized speech signal may be a synthesized version (or a reconstruction) of the user's own voice. In one aspect, this synthesized speech signal may be similar to a speech signal that would otherwise be produced by one of the noise suppressors 23 and 26, as described in FIGS. 2 and 3. As described herein, the accelerometer signal may only include (e.g., useful) spectral content below a frequency threshold (e.g., 2 kHz). Since speech signals (e.g., captured by microphone 20) may include spectral content ranging in higher frequencies (e.g., up to 10 kHz), the generator may synthesize a remainder of the spectral content (e.g., from 2 kHz and up) from the accelerometer signal in order to reconstruct the user's own voice. Thus, the generator may be configured to generate a synthesized audio signal based on the accelerometer signal. In one aspect, the generator may apply the accelerometer signal to a (predefined) synthesized speech model that produces the synthesized audio signal as output in response to (at least a portion of) the accelerometer signal as input. The generator 31 is configured to combine the synthesized audio signal with the accelerometer signal to produce the synthesized speech audio signal. In some aspects, this combination includes spectral content of the synthesized audio signal above a frequency threshold (e.g., 2 kHz) and spectral content of the accelerometer below (and at) the frequency threshold.

The audio renderer 32 is configured to produce a reverberant (synthesized) audio signal according to the set of one or more reverberation parameters. Specifically, the renderer 32 is configured to obtain the synthesized speech audio signal generated by the synthetic audio generator 31 and one or more reverberation parameters from the reverberation parameter generator 24 (via the normal wireless connection 41), and is configured to produce a reverberant synthesized audio signal from the synthesized audio signal according to the reverberation parameters. In one aspect, the audio renderer 32 may perform similar (or the same) operations as audio renderer 25, as described herein. Once produced, the controller 35 is configured to use the produced signal to drive the speaker driver 33.

Figure 5:
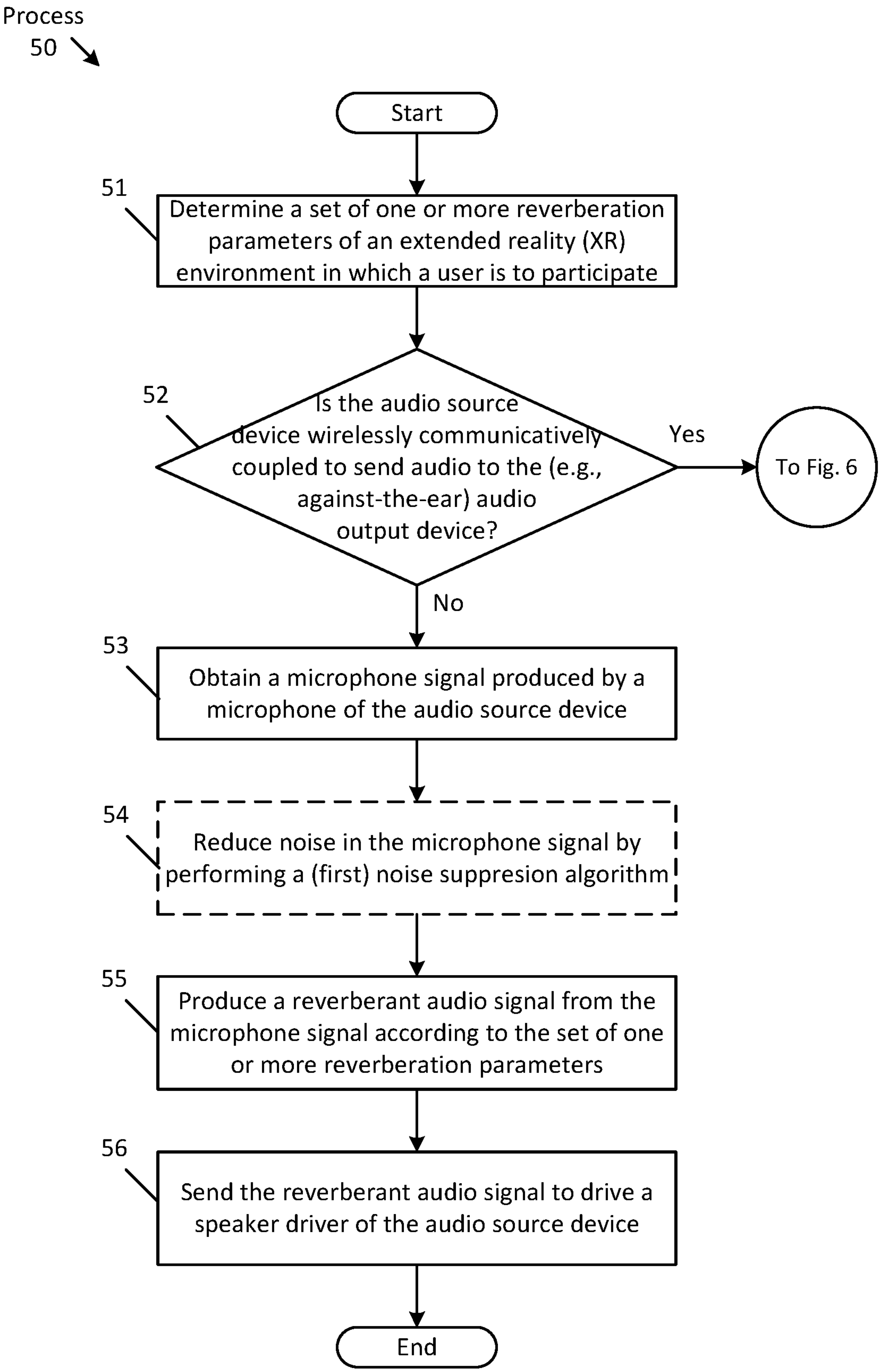
FIG. 5 is a flowchart of one aspect of a process in which the audio source device produces and outputs the reverberant audio signal in response to not being wirelessly communicatively coupled to the audio output device according to one aspect.

FIG. 5 is a flowchart of one aspect of a process 50 in which the audio source device produces and outputs the reverberant audio signal in response to not being wirelessly communicatively coupled to the audio output device according to one aspect. In one aspect, the process 50 is performed by (e.g., controller 22 of the audio source 2 of the) audio system 1. In some aspects, the process 50 may be performed while (or prior to) the audio system presenting a XR environment (e.g., by displaying image data upon display screen 27 and outputting XR environment audio data via one or more speaker drivers, such as driver 21) in which a user of the audio system is participating.

The process 50 begins by the controller 22 determining a set of one or more reverberation parameters of a XR environment in which the user of the audio system is to participate or is already participating (at block 51). As described herein, the reverberation parameter generator 24 may determine the reverberation parameters based on XR environment data. The controller 22 determines whether the audio source device is wirelessly communicatively coupled to send audio to the audio output device (at decision block 52). For instance, the controller 22 may determine whether wireless capabilities are activated and/or whether the source device has established a wireless connection with an audio output device. In one aspect, any known technique may be used to determine whether the two devices are wirelessly communicatively coupled.

Figure 6:
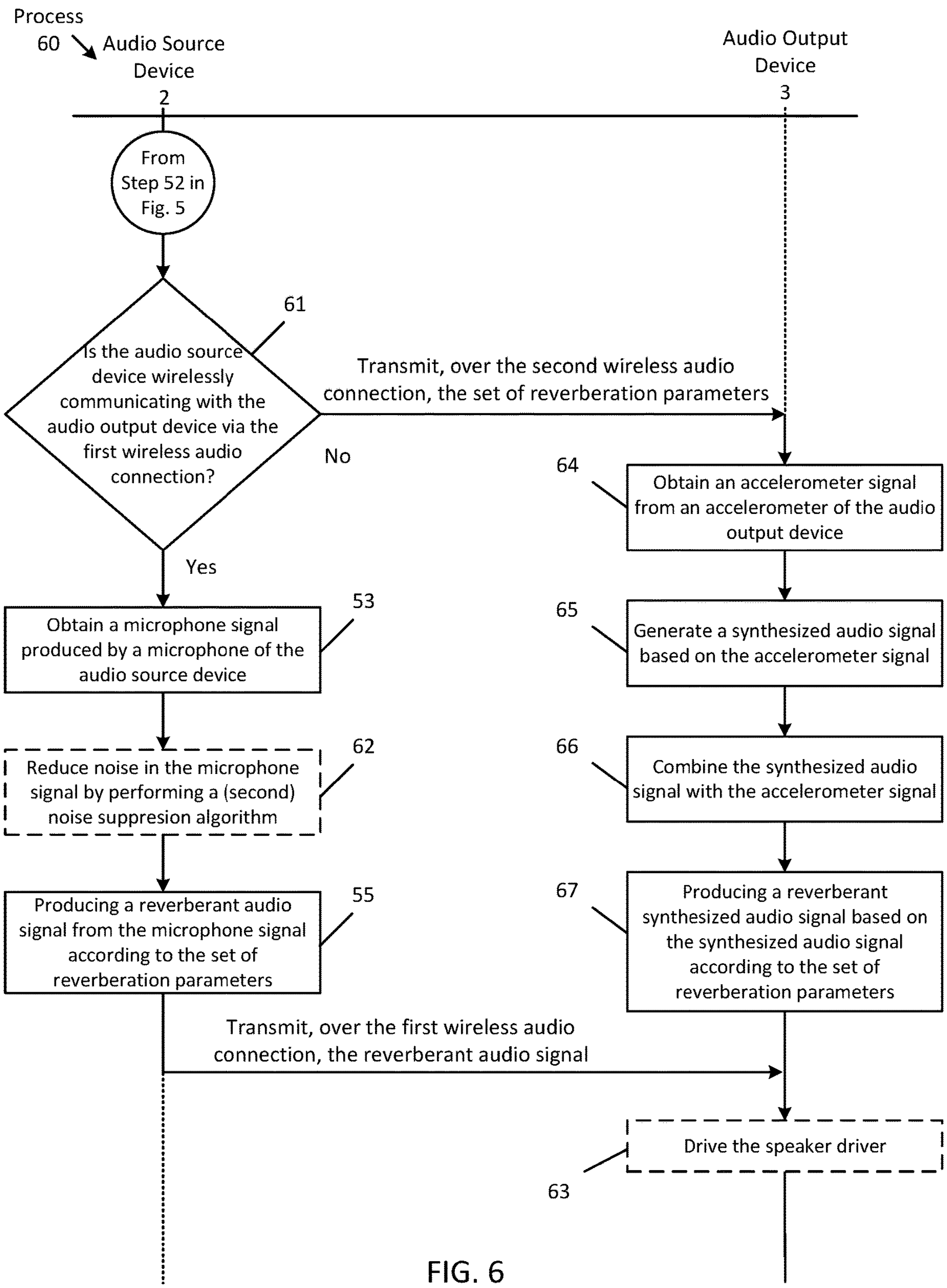
FIG. 6 is a flowchart of one aspect of a process in which the audio system operates in one of two operational modes according to one aspect.

If the audio source device and the audio output device are wirelessly coupled, the process 50 proceeds to FIG. 6. If not, however, the controller 22 obtains a microphone signal produced by a microphone (e.g., microphone 20) of the audio source device (at block 53). The controller 22 reduces (or eliminates) noise in the microphone signal by performing a (first) noise suppression algorithm (at block 54). Specifically, the noise suppressor 23 suppresses the noise to produce a speech signal that contains speech of the user. The controller 22 produces a reverberant audio signal from the microphone signal (e.g., from the speech signal) according to the set of one or more reverberation parameters (at block 55). The controller 22 sends the reverberant audio signal to drive a speaker driver 21 of the audio source device (at block 56).

FIG. 6 is a flowchart of one aspect of a process 60 in which the audio system operates in one of two operational modes based on whether the audio source device and the audio output device are wirelessly coupled via a normal or low-latency connection according to one aspect. In one aspect, at least some of the operations in process 60 may be performed by (e.g., controller 22 of) the audio source device 2 and/or performed by (e.g., controller 35) of the audio output device 3.

The process 60 begins by the audio source device 2 determining whether the audio source device is wirelessly communicatively coupled with the audio output device via the first wireless audio connection (at decision block 61). For instance, the controller 22 determines what wireless communication protocol (e.g., A2DP, ULLA, etc. over BLUETOOTH) the audio source device and the audio output device are using to communicate with each other. From this determination, the controller may determine the type of connection between the devices. In another aspect, the controller may determine the type of connection based on the codec being used to compress audio data. In one aspect, based on this information, the controller 22 may perform a table lookup into a data structure that associates this information with an indication of whether a connection is normal or low-latency. If the connection is a low-latency connection, the controller 22 performs similar operations as described in process 50 in FIG. 5. For instance, the controller 22 obtains a microphone signal (at block 53). The controller 22 reduces noise in the microphone signal by performing a (second) noise suppression algorithm (at block 62). Specifically, the noise suppressor 23 or lightweight noise suppressor 26, may perform noise suppression operations, as described herein. In one aspect, the second noise suppression algorithm performed by the controller may be different than the first noise suppression algorithm performed at block 54 in process 50 in FIG. 5. The controller 22 produces a reverberant audio signal from the (e.g., noise suppressed) microphone signal (e.g., speech signal) according to the set of reverberation parameters. The audio source devices 2 transmits, over the low-latency wireless audio connection, the reverberant audio signal, and the audio output device 3 drives one or more speaker drivers with the reverberant audio signal (at block 63).

If, however, both the audio source device 2 and the audio output device 3 are not coupled via the low-latency connection (and are therefore coupled via the second (normal) wireless connection), the audio source device transmits, over the normal wireless audio connection, at least a portion of the set of reverberation parameters. In one aspect, the audio source device may establish a separate connection with which to transmit the reverberation parameters. The audio output device 3 receives the parameters, and the controller 35 obtains an accelerometer signal from the accelerometer (e.g., accelerometer 30) of the output device (at block 64). The controller 35 generates a synthesized audio signal based on the accelerometer signal (at block 65). In particular, the synthetic audio generator may apply the accelerometer signal to a predefined model, which outputs the synthesized audio signal. The controller 35 combines the synthesized audio signal and the accelerometer signal to produce a synthesized speech audio signal that is a reconstruction of the user's own voice (at block 66). The controller 35 produces a reverberant synthesized audio signal based on the synthesized audio signal according to the set of reverberation parameters (at block 67). Specifically, the controller 35 may apply an amount of reverberation based on the parameters to a combination (or mix) of the synthesized audio signal and the accelerometer signal. The controller 35 then drives the speaker driver using the reverberant synthesized audio signal (at block 63).

Some aspects may perform variations to the processes 50 and 60 described in FIGS. 5 and 6, respectively. For example, the specific operations of at least some of the processes may not be performed in the exact order shown and described. The specific operations may not be performed in one continuous series of operations and different specific operations may be performed in different aspects. For instance, operations associated with blocks with dashed borders may be optional and not be performed within the processes. For example, process 50 in FIG. 5 may omit the step of reducing noise at block 54. As a result, the process may produce the reverberant audio signal from the (e.g., raw or non-processed) microphone signal.

As described thus far, while in the second operational mode, the audio output device 3 is configured to synthesize the user's own voice using an accelerometer 30. In another aspect, the audio output device may include at least one microphone, and may be configured to perform one or more operations performed by the audio source device 2, as described herein. For example, the controller 35 may be configured to obtain a microphone signal, reduce noise in the microphone signal by performing one or more noise suppression algorithms (e.g., to generate a speech audio signal), and produce a reverberant audio signal from the microphone signal according to the reverberation parameters, as described in any of the blocks 53-55 and/or 62 in FIGS. 5 and 6. In another aspect, the audio output device may be configured to produce a speech signal that includes speech spoken of the user using (at least a portion of) a microphone signal and/or (at least a portion of) the accelerometer signal. For example, rather than (or in addition to) synthesizing an audio signal based on the accelerometer signal, the audio output device may be configured to combine the microphone signal (e.g., spectral content above the frequency threshold) with the accelerometer signal (e.g., with spectral content below the threshold).

In some aspects, the audio system 1 may perform noise suppression operations while the system operates in either operational mode. Specifically, the system may perform at least some or different noise suppression operations when the audio source device is wirelessly coupled to the audio output device. As described herein, the audio source device 2 reduces noise in the microphone signal by performing the second noise suppression algorithm (e.g., the lightweight noise suppressor 26), when coupled via the first wireless connection. In another aspect, the audio source device may perform other noise suppression operations, such as those performed by the noise suppressor 23, as described herein. In another aspect, the audio output device may perform at least some noise suppression operations. Returning to the previous example in which the audio output device may obtain a microphone signal, the audio output device may perform one or more noise suppression operations (e.g., as described in block 54 in FIG. 5 and/or in block 62 in FIG. 6) upon the microphone signal to reduce captured noise. For instance, the audio output device may perform lightweight noise suppression operations while the system operates in the second operational mode in order to minimize latency.

In one aspect, a synthesized reconstruction of a user's own voice may be based on an accelerometer signal, as described herein. Specifically, the synthesized reconstruction may be produced by the synthetic audio generator 31 and may be a combination of spectral content of a synthesized audio signal that may be above a particular threshold frequency (e.g., 2 kHz) and spectral content of the accelerometer signal that may be below the particular threshold frequency. In some aspects, the reconstructed spectral content may be synthesized within a frequency range, such as between 2 kHz and (at least) 10 kHz. In one aspect, the ranges may be different.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:

determining a set of one or more reverberation parameters of an extended reality (XR) environment in which a user of an audio source device is to participate;

determining whether the audio source device is wirelessly communicatively coupled to a headset that is to be worn by the user; and responsive to determining that the audio source device is not wirelessly communicatively coupled to the headset:

obtaining a microphone signal produced by a microphone of the audio source device;

producing a first reverberant audio signal by applying an amount of virtual reverberation associated with the XR environment to the microphone signal, wherein the amount of virtual reverberation is defined by the set of one or more reverberation parameters; and playing back the first reverberant audio signal through a first speaker driver of the audio source device; and responsive to determining that the audio source device is wirelessly communicatively coupled to the headset, causing a second speaker driver of the headset to play back a second reverberant audio signal based on the set of one or more reverberation parameters.

2. The method of claim 1, wherein the method further comprises, responsive to determining that the audio source device is wirelessly communicatively coupled to the headset:

determining whether the audio source device is coupled via a first wireless audio connection or a second wireless audio connection; and responsive to determining that the audio source device is coupled via the first wireless audio connection:

obtaining the microphone signal produced by the microphone of the audio source device;

producing the second reverberant audio signal from the microphone signal according to the set of one or more reverberation parameters; and transmitting, over the first wireless audio connection, the second reverberant audio signal to the headset to cause the headset to play back the second reverberant audio signal through the second speaker driver.

3. The method of claim 2 further comprising, responsive to determining that the audio source device is coupled via the second wireless audio connection, transmitting, over the second wireless audio connection, the set of one or more reverberation parameters to the headset, wherein the headset is configured to:

obtain an accelerometer signal from an accelerometer of the headset, generate a synthesized audio signal based on the accelerometer signal, and produce the second reverberant audio signal based the synthesized audio signal according to the set of one or more reverberation parameters for play back through the second speaker driver.

4. The method of claim 3, wherein the second reverberant audio signal comprises a combination of the synthesized audio signal and the accelerometer signal.

5. The method of claim 4, wherein the second reverberant audio signal comprises spectral content from the synthesized audio signal above a frequency threshold and spectral content from the accelerometer signal below the frequency threshold.

6. The method of claim 5, wherein the frequency threshold is 2 kHz.

7. The method of claim 2, wherein the second wireless audio connection and the first wireless audio connection are both BLUETOOTH connections in which the first wireless audio connection has an end-to-end latency that is less than an end-to-end latency of the second wireless audio connection.

8. The method of claim 2, wherein the second wireless audio connection is an Audio Distribution Profile (A2DP) connection over BLUETOOTH, and wherein the first wireless audio connection is an Ultra-Low Latency Audio (ULLA) connection over BLUETOOTH.

9. The method of claim 2 further comprising:

responsive to determining that the audio source device is not wirelessly communicatively coupled to the headset, reducing noise in the microphone signal by performing a first noise suppression algorithm; and responsive to determining that the audio source device is wirelessly communicatively coupled to the headset via the first wireless audio connection, reducing the noise in the microphone signal by performing a second noise suppression algorithm.

10. The method of claim 9, wherein the first noise suppression algorithm comprises an adaptive beamformer and the second noise suppression algorithm comprises a non-adaptive beamformer.

11. The method of claim 1, wherein the audio source device is a head-mounted device and the first speaker driver is an extra-aural speaker.

12. An audio source device, comprising:

a microphone;

a first speaker driver;

a processor; and memory having instructions stored therein which when executed by the processor causes the audio source device to:

determine a set of one or more reverberation parameters of an extended reality (XR) environment in which a user of the audio source device is to participate, determine whether the audio source device is wirelessly communicatively coupled to a headset that is to be worn by the user, responsive to determining that the audio source device is not wirelessly communicatively coupled to the headset:

obtain a microphone signal produced by the microphone, produce a first reverberant audio signal by applying an amount of virtual reverberation associated with the XR environment to the microphone signal, wherein the amount of virtual reverberation is defined by the set of one or more reverberation parameters, and play back the first reverberant audio signal through the first speaker driver, and responsive to determining that the audio source device is wirelessly communicatively coupled to the headset, cause a second speaker driver of the headset to play back a second reverberant audio signal based on the set of one or more reverberation parameters.

13. The audio source device of claim 12, wherein the memory has further instructions to, in responsive to determining that the audio source device is wirelessly communicatively coupled to the headset, determine whether the audio source device is coupled via a first wireless audio connection or a second wireless audio connection, and responsive to determining that the audio source device is coupled via the first wireless audio connection, obtain the microphone signal produced by the microphone, produce the second reverberant audio signal from the microphone signal according to the set of one or more reverberation parameters, and transmit, over the first wireless audio connection, the second reverberant audio signal to the headset to cause the headset to play back the second reverberant audio signal through the second speaker driver.

14. The audio source device of claim 13, wherein the memory has further instructions to, responsive to determining that the audio source device is coupled via the second wireless audio connection, transmit, over the second wireless audio connection, the set of one or more reverberation parameters to the headset, wherein the headset is configured to:

obtain an accelerometer signal from an accelerometer of the headset, generate a synthesized audio signal based on the accelerometer signal, and produce the second reverberant audio signal based on the synthesized audio signal according to the set of one or more reverberation parameters for play back through the second speaker driver.

15. The audio source device of claim 14, wherein the second reverberant audio signal comprises a combination of the synthesized audio signal and the accelerometer signal.

16. The audio source device of claim 15, wherein the second reverberant audio signal comprises spectral content from the synthesized audio signal above a frequency threshold and spectral content from the accelerometer signal below the frequency threshold.

17. The audio source device of claim 13, wherein the first wireless audio connection and the second wireless audio connection are both BLUETOOTH connections in which the first wireless audio connection has an end-to-end latency that is less than an end-to-end latency of the second wireless audio connection.

18. The audio source device of claim 13, wherein the memory has further instructions to:

responsive to determining that the audio source device is not wirelessly communicatively coupled to the headset, reduce noise in the microphone signal by performing a first noise suppression algorithm; and responsive to determining that the audio source device is wirelessly communicatively coupled to the headset via the first wireless audio connection, reduce the noise in the microphone signal by performing a second noise suppression algorithm.

19. The audio source device of claim 18, wherein the first noise suppression algorithm comprises an adaptive beamformer and the second noise suppression algorithm comprises a non-adaptive beamformer.

20. The audio source device of claim 12, wherein the audio source device is a head-mounted device and the first speaker driver is an extra-aural speaker, and wherein the headset comprises an against-the-ear device.

21. A non-transitory machine-readable medium having instructions stored therein which when executed by at least one processor of an electronic device that includes a microphone and a first speaker driver, causes the electronic device to:

determine a set of one or more reverberation parameters of an extended reality (XR) environment in which a user is to participate, determine whether the electronic device is wirelessly communicatively coupled to a headset that is to be worn by the user via a first wireless audio connection or a second wireless audio connection, wherein the first wireless audio connection comprises a first end-to-end latency that is less than a second end-to-end latency of the second wireless audio connection, responsive to determining that the electronic device is wirelessly communicatively coupled to the headset via the first wireless audio connection:

obtain a microphone signal produced by the microphone, produce a first reverberant audio signal from the microphone signal according to the set of one or more reverberation parameters, and transmit, over the first wireless audio connection, the first reverberant audio signal to the headset for payback through a second speaker driver of the headset; and responsive to determining that the electronic device is wirelessly communicatively coupled to the headset via the second wireless audio connection, transmit, over the second wireless audio connection, the set of one or more reverberation parameters, wherein the headset is configured to produce, based on the set of one or more reverberation parameters, a second reverberant audio signal for playback through the second speaker driver.

22. The non-transitory machine-readable medium of claim 21, wherein the headset is configured to produce the second reverberant audio signal by:

obtaining an accelerometer signal from an accelerometer, generating a synthesized audio signal based on the accelerometer signal, and producing a reverberant synthesized audio signal from the synthesized audio signal according to the set of one or more reverberation parameters.

23. The non-transitory machine-readable medium of claim 22, wherein the reverberant synthesized audio signal comprises a combination of the synthesized audio signal and the accelerometer signal.

24. The non-transitory machine-readable medium of claim 23, wherein the reverberant synthesized audio signal comprises spectral content from the synthesized audio signal above a frequency threshold and spectral content from the accelerometer signal below the frequency threshold.

25. The non-transitory machine-readable medium of claim 21, wherein the first wireless audio connection and the second wireless audio connection are both BLUETOOTH connections in which the first wireless audio connection has an end-to-end latency that is less than an end-to-end latency of the second wireless audio connection.

26. The non-transitory machine-readable medium of claim 21, wherein the electronic device is a head-mounted device and the first speaker driver is an extra-aural speaker, and wherein the headset is an against-the-ear device.

* * * * *